United States Patent [19]

Molenda et al.

[11] 4,409,057
[45] Oct. 11, 1983

[54] STAPLE SUPPORTING AND REMOVING STRIP

[75] Inventors: Robert P. Molenda, Stillwater; George R. Rabuse, Sunfish Lake, both of Minn.

[73] Assignee: Minnesota Mining & Manufacturing Company, St. Paul, Minn.

[21] Appl. No.: 226,114

[22] Filed: Jan. 19, 1981

[51] Int. Cl.³ .............................................. B32B 19/00
[52] U.S. Cl. ................................. 156/92; 427/207.1; 428/332; 428/339; 428/357; 428/364; 428/375; 428/401; 428/343; 156/344; 281/5; 282/4; 412/7
[58] Field of Search ................. 428/40, 343, 352, 220, 428/332, 337, 339, 357, 364, 375, 401; 427/207.1; 156/344

[56] References Cited

U.S. PATENT DOCUMENTS

| Re. 24,906 | 12/1960 | Ulrich | 427/208 |
| 1,839,543 | 1/1932 | Flood |  |
| 2,335,715 | 11/1943 | Wallace | 29/13 |
| 4,151,319 | 4/1979 | Sackoff et al. | 428/40 |

Primary Examiner—George F. Lesmes
Assistant Examiner—E. Rollins Buffalow
Attorney, Agent, or Firm—Donald M. Sell; James A. Smith; John C. Barnes

[57] ABSTRACT

A staple-supporting strip for use with staples when binding documents together which affords removal and retention of the staples. The staple-supporting strip comprises a narrow elongate strip of tough polymeric material between 0.1 and 0.15 mm thick. The strip may be colored or printed with a window identifying the area for reception of the staples. A narrow coating of a low-tack pressure-sensitive adhesive facilitates positioning of the strip on the uppermost sheet of the documents to be stapled together.

11 Claims, 4 Drawing Figures

STAPLE SUPPORTING AND REMOVING STRIP

TECHNICAL FIELD

This invention relates to a strip which may be applied to the stack of sheets prior to the stapling of the sheets together such that upon subsequent peeling of the strip from the sheets the staples will be removed from the sheets and retained in the strip.

BACKGROUND ART

The patent art is replete with devices for the removal of staples to separate the staples from papers such that the papers may be individually fed into a copy machine, microfilming equipment, or separated for filing purposes. Examples of such devices are found in U.S. Pat. Nos. 2,750,148, 3,162,423, 3,344,649 and 3,494,591. Removing staples by any of these staple removers however is time consuming and utilize some dexterity to remove the staples rapidly and not have the staples lying around and being lost in the carpets or falling into the copying or microfilming equipment. The prior art also illustrates some devices whereby the staples can be separated from the papers and retained on the staple remover as by the incorporation of a magnet on the remover. Nonetheless, the operation is time consuming which is costly economically in the handling of documents.

The present invention provides a useful device in the form of a thin elongate strip of polymeric material which can be placed over selected sheets to be stapled prior to the stapling and then the staple is driven through the polymeric strip and the sheets. When it is desired to separate the sheets, e.g. sheets of paper, for filing, copying or microfilming the end of the strip is grasped firmly between the thumb and the forefinger and peeled from the sheets. Upon this peeling movement the staple is withdrawn from the sheets and the staple or staples are retained in the polymeric strip.

Prior art relating to staple supporting devices which protect against disengagement and deform the staple on removal includes U.S. Pat. No. 1,839,543 (Flood) issued Jan. 5, 1932; U.S. Pat. No. 2,335,715 (Wallace) issued Nov. 30, 1943 and U.S. Pat. No. 4,129,059 (Van Eck) issued Dec. 12, 1978.

Flood discloses a pin ticket for identifying the merchant or price of merchandise. This ticket is generally attached by machine and the wire staple passes through the sheet, e.g. fabric, and through the tag and is then bent rearwardly so that the points of the staple meet the outer face of the patch. Upon removal of the tag the tag, preferably is defaced, and the staple deformed so that the removed ticket cannot be replaced or substituted by hand. This tag is positioned on the sheet opposite the crown of the staple and is not intended to remove the staple upon pulling the tag away.

Wallace discloses a customary pin ticket for pricing merchandise which uses a wire staple of soft and ductile wire. The ticket and wire staple are supplied with the staple in the ticket and it is then placed on the goods. The ends of the staple are then turned or bent over to secure the ticket to the object. The staple ends are usually clamped to the ticket body and removal of this ticket usually removes the staple. The damage to the goods was dependent on the type of material used in the goods and the wire of the staple.

Van Eck discloses a staple-type fastener for attaching delicate sheet materials and discloses a fastener having a cross-member which is substantially wider than the attached prongs and uses a receiving plate in conjunction with the fastener. The cross-member may be made of metal or plastic sufficiently strong so that the prongs are retained within the cross-member, examples are polypropylene or polyvinyl chloride. The width of the cross-member is at least three times the width of the prongs. As recited, the receiving plate is provided with a tab to facilitate unclenching the prongs without the cross-member being pulled through the sheets or both the cross-member and the receiving plate may have tabs which can be grasped to unclench the staples. The cross-members are not designed to facilitate the insertion of additional staples or afford removal without the receiving plate.

The strip of the present invention is placed over a series of documents to be stapled together and one or more staples are driven through it. If additional sheets must be added to the stack they may be placed behind the first sheets and an additional staple pressed through the polymeric strip and into the new pages. Upon separation of the pages the strip is peeled from the uppermost sheet. The staples will be removed from the sheets by the strip and, depending upon the number of sheets stapled together, the legs of the staple are opened but the staples are retained in the polymeric strip.

DISCLOSURE OF INVENTION

The present invention is directed to a staple-supporting strip for use in binding sheets together and affords removal of the staples binding the sheets when desired. The staple-supporting strip comprises a narrow elongate strip of tough polymeric material which is flexible. The thickness of the strip is between 0.1 and 0.15 mm (0.004 and 0.006 inch). The strip preferably has a width of between 1.5 cm and 2.5 cm (0.5 and 1.0 inch) and a length of between 3 cm and 9 cm (1.13 and 3.5 inches). The strip may be colored to afford identification or it may be printed with a transparent color ink, leaving a window identifying the area for reception of the staples. Also, means are provided for adhering the strip to the sheets initially, which means includes a narrow coating of a pressure-sensitive adhesive extending transversely of the strip intermediate the ends thereof.

BRIEF DESCRIPTION OF DRAWINGS

The present invention will be more fully described hereinafter with reference to the accompanying drawing wherein.

BEST MODE FOR CARRYING OUT THE INVENTION

Figure 1:
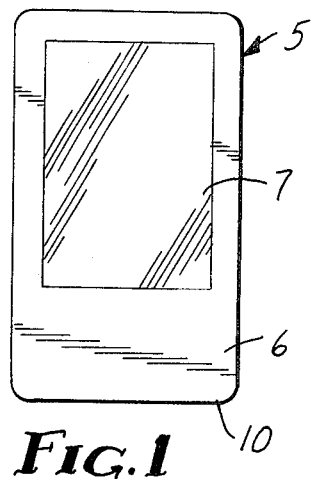
FIG. 1 is a plan view of a staple-supporting strip.

The present invention relates to a staple-supporting strip which affords the easy removal of one or more staples from a stack of documents having two or more sheets but generally less than fifteen.

The staple-supporting strip of the present invention is generally designated by the reference numeral 5 and provides a fast economical way of removing one or more staples in one operation after a series of documents have been stapled together. In many document handling operations, such as accounting, billing, or the like, a pair of documents are stapled together and then perhaps additional documents are received which are fastened to the first documents. This is true where the original order or shipping document and invoice are stapled together perhaps, then the weigh bill, and then documents dealing with payment of the invoice. Subsequent to completion of the transaction all of the documents are separated and microfilmed to afford a permanent record of the transaction and the documents associated therewith. The documents must be separated prior to microfilming and it is generally necessary for clerical people to remove each of the staples to allow efficient machine handling. Removal of the staples using conventional staple removers takes a considerable amount of time. Time is required to align the removal device with the staple and to remove each staple successively. Some of the staples break and remain in the papers or can fly up and cause injury. The staples usually are left lying around and find their way to the carpet, clothing or occasionally some of them drop into the microfilming or copying equipment. This is very undesirable in that additional time must then be taken to pick up the staples or to remove the same from the equipment. The staple-supporting strip of the present invention provides a cost effective staple removing and staple capturing device and it provides a paper reinforcement at the stapled area when the documents are fastened. The staple-supporting strip is preferably transparent and colored such that it provides a means for locating the staples and at the same time it does not hide the printed matter beneath the staple-supporting strip. The color of the strip may be used to prioritize or designate different types of documents.

The staple-supporting strip 5 comprises a strip of tough polymeric material which is transparent and flexible so as to be flexed by the sheets of paper, etc. without tearing the sheets. The polymeric strip is preferably formed from polyethylene terephthalate film 0.1 to 0.15 mm (0.004 to 0.006 inch) thick and which has been oriented, preferably from 3 to 3.5:1 in the machine direction and at least 4:1 in the cross direction. The staple-supporting strip preferably has a width of between 1.5 and 2.5 cm (0.5 and 1 inch) and a length of between 3 and 9 cm (1.13 and 3.5 inches). A staple supporting strip of 3 cm (1¼ inches) by 2.5 cm (1 inch) in overall dimension can be used in fastening a single strip on two pieces of paper and attaching the same with one staple, or additional pieces of paper can be attached with two or more staples. A single tab of this size could accommodate up to approximately 8 staples which are 1.2 cm (0.5 inch) wide at the crown with a 0.6 cm (0.25 inch) leg.

Figure 3:
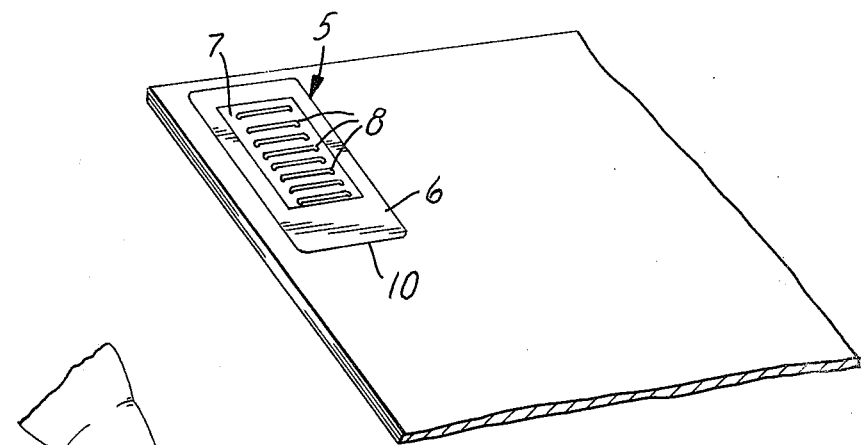
FIG. 3 is a schematic perspective view of a staple supporting strip on top of documents.

As illustrated in FIG. 1, the strip 5 may be printed with a transparent ink 6 in selective areas, and as illustrated, provides a window 7 in the strip which will serve to locate the staple area. The window is illustrated as 1.9 cm wide and 2.9 cm long (¾ of an inch wide and 1⅛ inches long) accommodating easily 8 staples 8, see FIG. 3. The window is spaced 1.2 cm (½ inch) from one end of the strip 5, providing a lifting area or tab which may be grasped in one hand and peeled from the paper held with the other hand and moved in the direction of the staples. This operation is illustrated schematically in FIG. 4.

One example of a staple-supporting strip comprises a strip of polyethylene terephthalate (polyester) film 0.12 mm (0.00461 inch) thick with an orientation in the machine direction of 3 to 3½:1 and 4:1 in the cross direction. The strip was tested as follows:

| Property | ASTM Method | Units | Target | 95% Limits |
|---|---|---|---|---|
| Tensile-first M.D. | D-882 | lbs./in. | 60.8 | 54.6–67.0 |
| 3% of stretch C.D. | D-882 | lbs./in. | 66.8 | 58.5–75.1 |
| Tensile - at M.D. | D-882 | lbs./in. | 130.0 | 103.5–156.5 |
| break C.D. | D-882 | lbs./in. | 182.0 | 151.6–212.4 |
| Elongation M.D. | D-882 | % | 150.0 | 110.0–190.0 |
| C.D. | D-882 | % | 85.0 | 55.0–115.0 |
| Thickness | — | inch | 0.00461 | 0.00433–0.00489 |

Strips of this general construction were tested with respect to usage involving one tab, one staple, and two or more sheets of paper.

The procedure followed and results are outlined below:

| | |
|---|---|
| Test Equipment | Instron ® Model TM; cross-head speed - 50 inches/min. |
| Stapler | Swingline ® 94-41 |
| Staples | Swingline ® Standard Staples No. 35-2D (½ inch wide, ¼ inch leg) |
| Paper | Secretary ® 696 Type White Bond |

| No. Sheets | No. Staples | Removal Force (gms.)* | Observations |
|---|---|---|---|
| 2 | 1 | 550 | Staple not unclenched, paper tearing |
| 3 | 1 | 670 | Staple slightly unclenched, paper tearing |
| 4 | 1 | 750 | Staple moderately unclenched, paper tearing |
| 5 | 1 | 810 | Staple unclenched, no paper tearing |
| 6 | 1 | 840 | Staple unclenched, no paper tearing |
| 7 | 1 | 870 | Staple unclenched, no paper tearing |
| 8 | 1 | 860 | Staple unclenched, no paper tearing |
| 9 | 1 | 860 | Staple unclenched, no paper tearing |
| 12 | 1 | 950 | Staple unclenched, no paper tearing |
| 15 | 1 | 990 | Staple unclenched, no paper tearing |
| 18 | 1 | 1100 | Staple unclenched, but one staple leg pulled out of strip |
| 21 | 1 | 1060 | Staple unclenched, but one staple leg pulled out of strip |
| 30 | 1 | 1330 | One leg of staple still in papers. Other leg unclenched and out of paper. Staple completely torn thru strip |

*As the number of sheets of paper increases, the force required for staple removal increases principally because the length of the clenched part of the staple decreases thereby shortening the length of the bending moment.

The strip failed to remove the staple when clenched through more than 15 sheets of paper.

It is desirable to have means to adhere the strip to the upper surface of the top sheet such that when stapling the strip to the sheets the fingers can be well away from the stapler and the strip will not shift. This can be accomplished by a readily releasable pressure-sensitive adhesive that will permit removal of the strip with the staples and not deleteriously affect the fibers or indicia on the surface of the sheets or leave a residue on the surface. The adhesive permits the placement of the staple-supporting strip on the document at the time of printing or at a station in advance of the stapling operation. This may then reduce the time to affect the binding of a series of documents and the adhesive maintains the strip in place during the stapling operation.

The preferred adhesive is an acrylate copolymer microsphere structured adhesive as disclosed in U.S. Pat. No. 3,691,140 issued to Silver on Mar. 9, 1970 and U.S. Pat. No. 3,857,731 issued to Merrill et al on Apr. 6, 1973. This type adhesive allows for the repositioning of the strip on the documents and for the removal of the staple-supporting strip with the staples without injury to the paper surface or lifting the printing therefrom by the adhesive.

Figure 2:
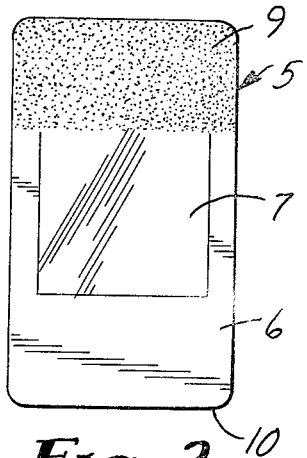
FIG. 2 is a bottom view of a staple-supporting strip.
Figure 4:
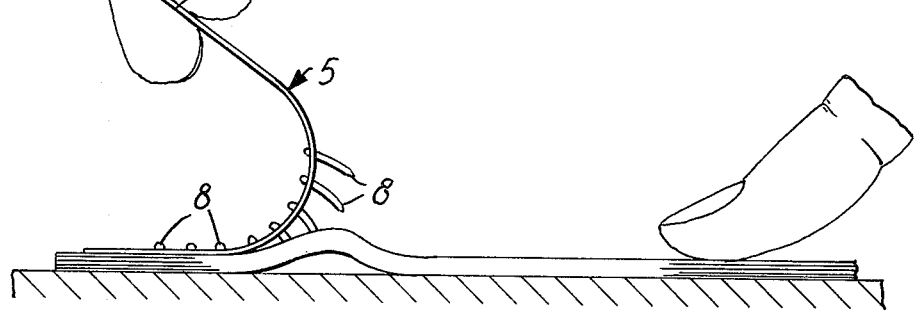
FIG. 4 is a schematic view of the removal of a staple supporting strip.

As shown in FIG. 2, the adhesive 9 is coated onto the strip adjacent one end which end is opposite the free end 10 of the strip to which the peeling force is applied as illustrated in FIG. 4.

The adhesive may be applied to the strip as a double coated tape. The tape is coated on one side with a high-tack (permanent) pressure-sensitive adhesive and on the other side with an acrylate copolymer microsphere structured adhesive as disclosed above. The high-tack adhesive, e.g., the adhesive disclosed in U.S. Pat. No. RE. 24906, coated surface is applied against the staple-supporting strip. The tape backing can be a polyester film and the tape thickness (with the two adhesive coated surfaces) would be approximately 0.003 inch (0.08 mm). A release liner is generally applied to the microsphere structure adhesive side of the double coated tape prior to lamination to the strip.

A manufacturing method comprises the use of six inch wide polyethylene terephthalate film. A window border using Flexotuf Process 391 Yellow F-84464 ink supplied by Inmount Corporation, of Clifton, N.J. 07012 is printed on the film. The long dimension 3.2 cm (1¾ inch) of the tab will be printed three across on the film. One-half inch wide strips of double coated tape then will be laminated to the printed film. The release liner is removed and a paper liner is laminated to the six inch wide film to facilitate the subsequent die cutting operation. After die cutting, the film waste and paper liner are removed and the staple-supporting strips 5 are stacked into piles of approximately 200.

Films other than polyester have been tried but lack the necessary properties such as toughness, and/or flexibility, and/or cost. The film must have a combination of high-tensile strength, at low elongation, high tear strength and high bursting strength. The other films tried included polyethylene, polypropylene, polycarbonate, regenerated cellulose, cellulose acetate - triacetate -butyrate - propionate, polyamide (nylon), polyvinyl chloride (plasticized and unplasticized), non-wovens, polyester/polyethylene laminates, polystyrene (plain and rubber modified), and filament tape.

Having disclosed a preferred embodiment of the present invention and alternative embodiments, it is to be understood that this invention is directed to a narrow strip of a sufficiently tough polymeric film to receive the ubiquitous staple in a transverse placement and support the crown of that staple as the strip and sheets are peeled apart.

I claim:

1. A staple-supporting strip for use in overlying sheets to be stapled and affording subsequent removal and retention of the staples comprising a narrow elongate strip of tough polymeric material with a thickness of between 0.1 and 0.15 mm (0.004 and 0.006 inch) and having a width dimension of between about 1.5 cm and 2.5 cm (0.5 and 1 inch) and having a length of between 3 cm and 9 cm (1.13 to 3.5 inches), and a band of microsphere structured adhesive means on said strip for temporarily adhering said strip to the surface of a said sheet with no build-up in the adhesive bond, thereby permitting removal of the strip without deleteriously affecting said surface or leaving a residue at any time upon the subsequent removal of the strip.

2. A staple-supporting strip according to claim 1 wherein said strip is formed of polyethylene terephthalate.

3. A staple-supporting strip as defined in claim 1 wherein said band of adhesive means comprises a narrow transversely extending strip of readily releasable pressure-sensitive adhesive disposed adjacent one end of said elongated strip.

4. A staple-supporting strip according to claim 3 wherein said adhesive is an acrylate copolymer microsphere structured adhesive.

5. A staple-supporting strip according to claim 1 wherein said band of adhesive means comprises a narrow strip of double coated pressure-sensitive adhesive tape applied to one surface of said strip, with the surface of said tape exposed having said microsphere structured pressure-sensitive adhesive coated thereon.

6. A staple-supporting strip according to claim 5 wherein said readily releasable adhesive is an acrylate copolymer microsphere structured adhesive.

7. A staple-supporting strip according to claim 1 wherein said strip has a colored ink coating on one surface thereof.

8. A staple-supporting strip according to claim 2 wherein said strip has a colored transparent ink coated on one surface thereof.

9. A staple-supporting strip according to claim 7 or 8 wherein said ink is applied on said strip in selected areas to define a rectangular staple-receiving area on said surface.

10. A staple-supporting strip according to claim 4 wherein said strip has a coating of transparent colored ink on the opposite surface, said ink coating being applied selectively to define a rectangular staple-receiving area on said strip.

11. Method of preparing staples for removal from documents comprising the steps of:
    placing on the sheets to be stapled a narrow elongate strip of tough polymeric material having a width dimension of between about 1.5 cm and 2.5 cm and having a length between about 3 cm and 9 cm,
    pressing the strip against the uppermost sheet to adhere the strip to the sheet by contacting an adhesive coated area of the strip to said uppermost sheet,
    placing the legs of a wire staple across the width of the strip and through said strip and the sheets being stapled,
    whereby upon grasping an end of a said strip the strip can be peeled from said uppermost sheet and the staple will be drawn out of said sheets.

* * * * *